(12) United States Patent
Vandenbulcke et al.

(10) Patent No.: US 8,428,231 B2
(45) Date of Patent: Apr. 23, 2013

(54) SERVICE DELIVERY PLATFORM DOCKING STATION

(75) Inventors: Raoul Vandenbulcke, Rome (IT);
Alessandra Macchietti, Rome (IT);
Roberto Privitera, Rome (IT); Dario DiBella, Monte Porzio Catone (IT);
Paolo Filetti, Rome (IT)

(73) Assignee: Accenture Global Services Limited, Dublin (IE)

( * ) Notice: Subject to any disclaimer, the term of this patent is extended or adjusted under 35 U.S.C. 154(b) by 751 days.

(21) Appl. No.: 12/564,579

(22) Filed: Sep. 22, 2009

(65) Prior Publication Data
US 2010/0208875 A1 Aug. 19, 2010

(30) Foreign Application Priority Data

Feb. 16, 2009 (EP) .................................. 09425064
Jul. 2, 2009 (EP) .................................. 09008688

(51) Int. Cl.
*H04M 15/00* (2006.01)
(52) U.S. Cl.
USPC .................. 379/114.01; 379/88.17; 705/7.13
(58) Field of Classification Search ............. 379/114.01, 379/88.17; 705/7.13
See application file for complete search history.

(56) References Cited

U.S. PATENT DOCUMENTS

2007/0150480 A1* 6/2007 Hwang et al. .................... 707/10

OTHER PUBLICATIONS

Morelli, Filetti; Accenture XP-001523010 "The Service Delivery Platform Is Dead. Long Live SDP 2.0!"; Annual Review of Communications, vol. 61; 2008; pp. 551-554.
Morelli, Filetti and Socher; "The service delivery platform is dead. Long live SDP 2.0!"; accenture Outlook Point of View; May 2008, No. 1; 2 pg.
Extended European Search Report; Application No. 09008688.5-1243; Oct. 6, 2009; 9 pg.

* cited by examiner

*Primary Examiner* — Gerald Gauthier
*Assistant Examiner* — Simon King
(74) *Attorney, Agent, or Firm* — Brinks Hofer Gilson & Lione

(57) ABSTRACT

A service delivery platform (SDP) docking station (DS) is part of a multiple layer service delivery platform implementation. The SDP DS adds a second SDP layer between the end user and the Core SDP. The Core SDP implements the process flows that enable, provision, and execute telecommunications products and services. The SDP DS provides a customizable front end to the Core SDP to provide local service provider customization, flexible local selection and activation of products and services, and other features.

15 Claims, 11 Drawing Sheets

SERVICE DELIVERY PLATFORM DOCKING STATION

PRIORITY CLAIM

This application claims the priority benefit of EPO Application No. EP 09 425 064.4, filed Feb. 16, 2009 assigned attorney docket number 10022/1476 and EPO Application No. EP 09 008 688.5, filed Jul. 2, 2009 assigned attorney docket number 10022/1540, both of which are incorporated herein by reference in their entirety.

BACKGROUND OF THE INVENTION

1. Technical Field

This application relates to a multiple layer implementation for a service delivery platform, which may, for example, support selection, activation, and provisioning of telecommunications services.

2. Related Art

The demand for telecommunications products and services continues to be driven by strong market demand for new services, enhanced capabilities for existing services, and increased cost effectiveness for those services. In the past, implementing telecommunications products and services required a significantly complex and expensive monolithic service delivery platform for implementing, provisioning, and executing telecommunications services. The monolithic service delivery platforms were inflexible, took long to implement and debug, and provided little, if any, customization capability.

SUMMARY

A service delivery platform (SDP) docking station (referred to below as an "extension") is part of a multiple layer service delivery platform implementation. The SDP extension adds, for example, a second SDP layer between the end subscriber and a core SDP. The core SDP implements the logic that enables, provisions, and executes telecommunications products and services. The SDP extension provides a customizable front end to the core SDP, to solve the technical problems of local service provider customization, flexible local selection and activation of products and services, and other technical problems.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
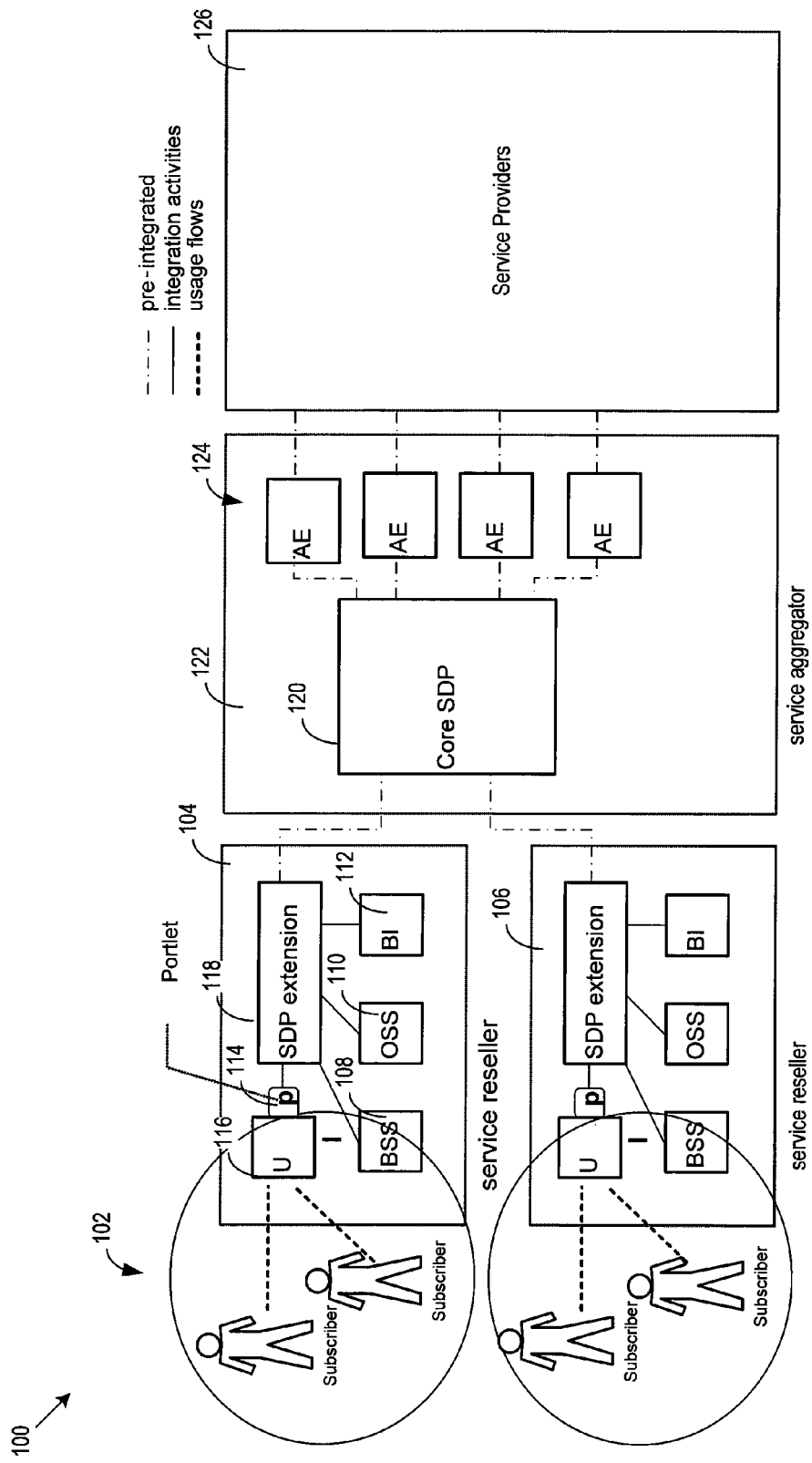
FIG. 1 shows a multiple layer service delivery platform.

FIG. 1 shows a multiple layer service delivery platform 100, including service delivery platform (SDP) docking stations (referred to as "extensions" below) that facilitate multi-location deployments of telecommunications products and services. The SDP extensions facilitate locally reselling services that are executed centrally by a full functionality core installation of a SDP. The core SDP is typically located remotely with respect to the SDP extension at a major telecommunications service provider installation (which may be in another city, state, or country). The local resellers may thereby maintain immediate contact and management with their customers and employ local billing and customer management systems, while leveraging the substantial infrastructure of the core SDP to resell services supported by the core SDP. The SDP extensions expose the services implemented at the core SDP, but permit local management and reselling of those services.

FIG. 1 shows that subscribers 102 interact with local service resellers 104, 106. The local service resellers 104, 106 implement local support for telecommunications products and services, such as the Business Support Systems (BSS) 108, operations support systems (OSS) 110, and Business Intelligence Systems (BI) 112. The subscribers interact with the local service resellers 104, 106 through portlet logic 114 installed in a user interface 116.

The service resellers 104, 106 include service delivery platform extensions, such as the service delivery platform (SDP) extension 118. The SDP extension 118 communicates with the local BSS 108, OSS 110, and BI 112 to locally handle billing, support, service integration, reporting, and other telecommunications service provider functions. In addition, the extension 118 communicates with the core SDP 120 in place at a site established by a service aggregator 122. To that end, the core SDP 120 may expose web services interfaces toward the service resellers over which the SDP extension 118 communicates with the core SDP 120 to execute locally requested services.

The service aggregator 122 communicates through application enablers 124 to service providers 126. In the service aggregator 122, the core SDP 120 implements service execution and service provisioning to fulfill service requests and service provisioning requests arriving from the SDP extension 118. Accordingly, the core SDP 120 provides the fundamental capabilities to handle telecommunications service orchestration, service management, service catalogues, service subscriptions, identity management, and third party management. The service aggregator 122 may be an Accenture™ service factory, an aggregator client, or other service aggregator that provides a core SDP.

Thus, FIG. 1 shows a multi-layer service delivery platform implementation 100. The implementation 100 implements service delivery in two layers. The first layer 128 includes the core SDP 120. The second layer 130 includes the localized SDP extensions 118, BSS, OSS, and other support systems which collaborate with the core SDP 120 to deliver services to local subscribers, and which facilitate local management and customization of user experience (e.g., personalized look and feel) for the local subscribers. The resultant multi-location SDP (composed of the two layers 128 and 130) exposes the same services as provided by the core SDP 120, but implements its own user interfaces in the SDP extensions 118, and routes messages or parts of messages to local systems (e.g., the OSS 110 or BSS 108) for local accounting.

Figure 2:
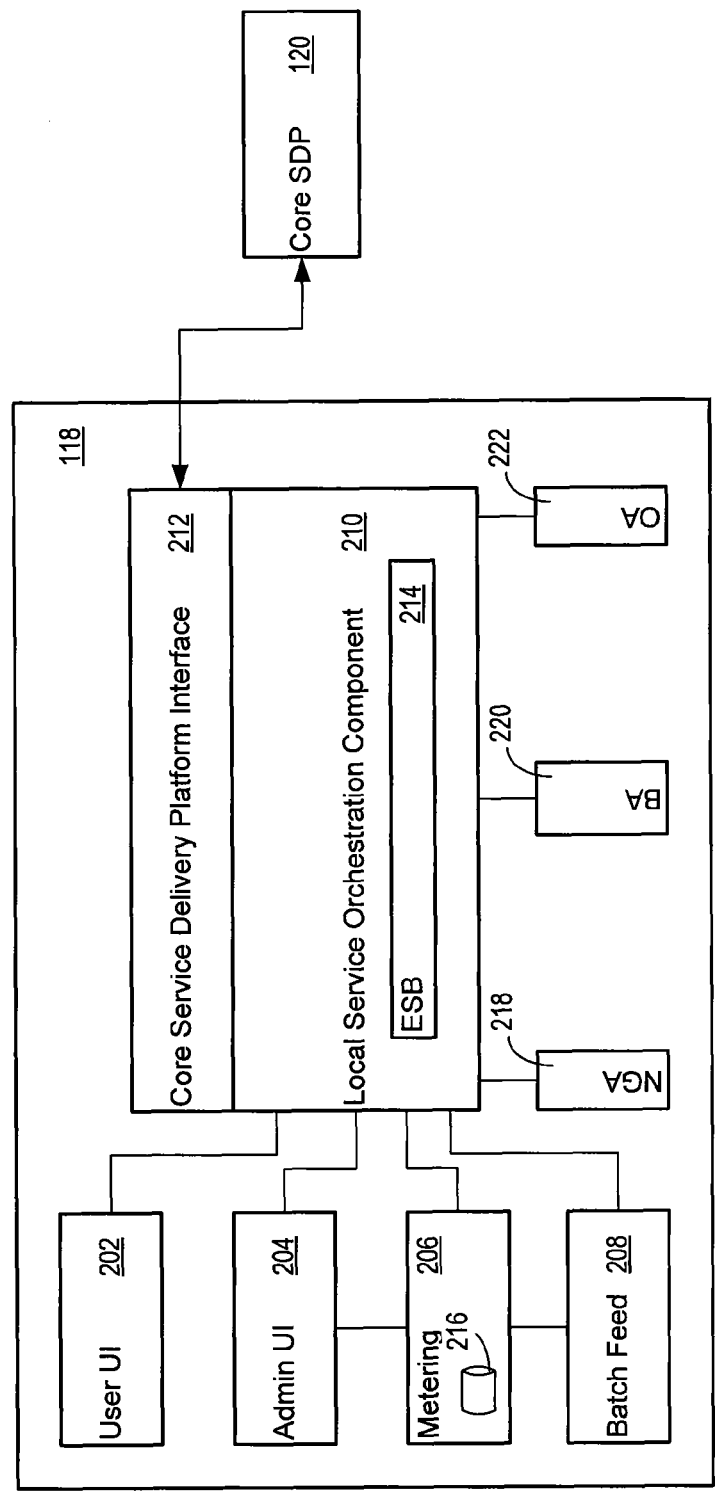
FIG. 2 shows a block diagram of a service delivery platform extension.

FIG. 2 shows a block diagram of the extension 118. The extension 118 includes a subscriber user interface component 202, an administration user interface component 204, a service metering component 206, and a batch feed component 208. The extension 118 further includes a local service orchestration component 210, in which a core service delivery platform interface component 212 resides. The local service orchestration component 210 implements an enterprise service bus 214 which provides a message transport mechanism for and between the components 202, 204, 206, 208, and 212. The local service orchestration component 210 may be implemented with service provisioning logic that is operable to generate a local service provisioning interface on the subscriber user interface component, receive a subscriber service provisioning request for a telecommunication service through the subscriber user interface component 202, and communicate the subscriber service provisioning request through the local service orchestration component 210 (e.g., using the ESB 214) to the core service delivery platform interface component 212. The service provisioning logic may further communicate telecommunications service provisioning messages, through the core service delivery platform interface component 212, to the remote core SDP 120 which implements service provisioning to fulfill the service provisioning request. The metering component 206 may locally meter telecommunications service calls flowing through the SDP extension 118 and arising from the telecommunication service.

The core service delivery platform interface 212 may implement any desired service proxies toward the core SDP 120 business services. These proxies natively integrate the extension 118 with the core SDP 120. The interface 212 may expose the service proxies as APIs, and may include message transformation logic to convert message formats used within the SDP extension 118 to message formats used within the core SDP 120. When each service call is invoked, within the SDP extension 118 the ESB 214 may duplicate corresponding support messages. One copy of the messages may route through the core service delivery platform interface 212 to the core SDP 120 to execute the core processing needed to support the service. Another copy of the messages, or portion thereof, may be used for local logging and metering, CDR generation, for BSS and OSS functionality and reporting, or other local functions.

The service orchestration component 210 implements a centrally managed messaging layer (e.g., with an ESB 214) as a single point of contact to the subsystems (e.g., 202, 204, 206, 208, 218, 220, 222, 212) within the SDP extension 118. The service orchestration component 210 further provides connectors to entities interacting with the service orchestration component 210.

The subscriber user interface component 202 may be implemented with a web application that subscribers access to activate, configure, and execute the services exposed by the extension 118. Because the extension 118 is a localized layer separate from the core SDP 120, the extension 118 may be widely customized to align with the look and feel desired by the local service reseller. In one implementation, the service orchestration component 210 exposes Simple Object Access Protocol (SOAP)-based Application Programming Interfaces (APIs) for accessing the functions provided by the core SDP 120, and the subscriber user interface component 202 invokes the SOAP-based APIs and in turn exposes a web-based graphical user interface (GUI) to the subscriber.

The administration user interface component 204 may be implemented as a web application that an administrator accesses to manage the extension 118. As examples, the administration user interface component 204 may configure and monitor service orchestration, configure metering preferences for the metering component 206, and access metering and other reports.

The metering component 206 intercepts service calls, or data extracted from service calls, flowing through the service orchestration component 210. The metering component 206 may then store any desired information related to telecommunications service calls flowing through the service delivery platform extension 118 into a persistent layer 216, such as a metering database. In one implementation, XML Stylesheets (XLSTs) define the fields of each message to be saved by the metering component 206, such as user ID, time of request, duration of request, and other fields for building a CDR. The administration user interface component 204 configures the metering component 206 to set verbosity and depth of information that will be captured and retained in the persistent layer 216. The metering component produces Call Data Records (CDRs) for billing purposes.

The batch feed component 208 communicates data extracted from the metering component 206 to external systems on any desired schedule and with regard to any desired information stored in the persistent layer 216. In one implementation, the batch feed component 208 asynchronously extracts data according to an XML filter, transforms the data using XLST, and invokes an external engine, such as a rating or charging engine with the transformed data.

The network gateway adaptor (NGA) 218 converts requests to and from network elements. For example, the NGA 218 may be a Short Message Service (SMS) gateway and may convert messages from one datamodel format to another (e.g., consistent with the Short Message Peer to Peer (SMPP) protocol) for integrating, for example, with an SMS-Center. In other implementations, the NGA 218 may provide one or more network layers for communicating with any external entity.

The business adaptor 220 may implement a real-time interface toward the business support systems 108, such as customer resource management (CRM) and billing systems. For inbound requests the business adaptor 220 exposes web services APIs for the CRM systems to query extension 118 data. For outbound requests, the business adaptor 220 may send real-time CDRs to the billing systems (108) and may also implement message adaptation to convert message from one system format to another.

The operation adaptor 222 may provide a real-time interface toward the OSS 110, including integrated order management (IOM) and service assurance. For IOM, the operation adaptor 222 may expose APIs for user subscription to services. For service assurance, the operation adaptor 222 may expose a consolidated set of extension status flags and alarms.

Figure 3:
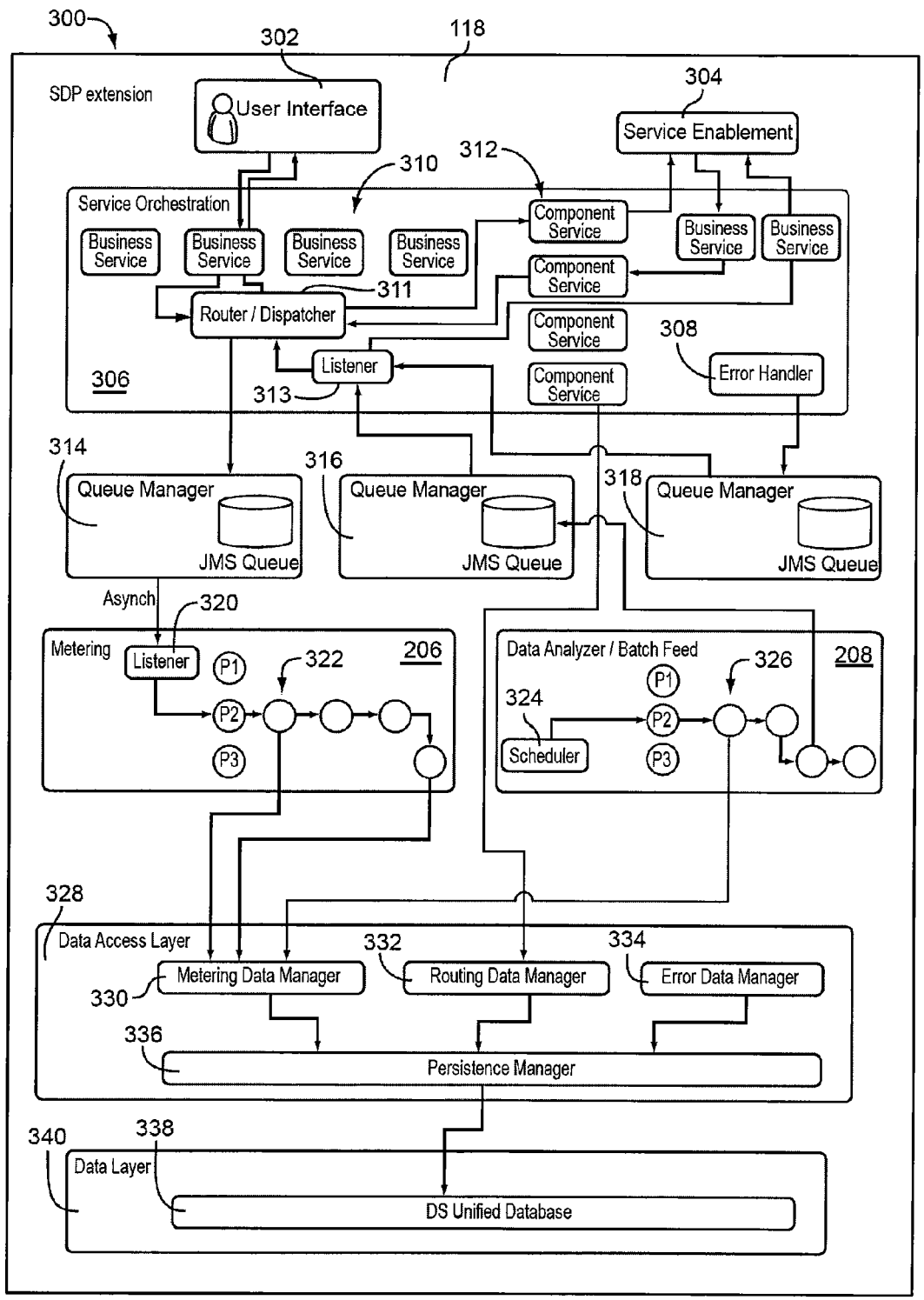
FIG. 3 shows an architecture diagram of a service delivery platform extension.

FIG. 3 shows an example architecture 300 of a service delivery platform extension 118. The architecture 300 includes user interfaces 302, such as the subscriber user interface 202 and the administration user interface 204. The architecture 300 further includes a service enablement interface 304, which may connect to any service delivery platform or other system that helps to provision, activate, or establish any desired telecommunication product or service. As one example, the service enablement interface 304 may communicate with the core SDP 120 using web services calls.

The architecture 300 also includes a service orchestration layer 306, which may implement the functionality noted above with respect to the local service orchestration component 210, the core service delivery platform interface 212, or other logic, such as the error handler logic 308. Inside of the service orchestration layer 306, business services 310 and component services 312 are defined and executed. The business services 310 provide provisioning services, such as adding a user, removing a user, clearing user data; authentication services; and service execution services, which invoke the corresponding service through the core SDP 120. The component services 312 may be provided to invoke external web services or other logic.

In one implementation, the service orchestration layer 306 includes routing and dispatching logic 311 and listener logic 313 to facilitate the communication of messages between the service orchestration layer 306 and the remainder of the architecture 300. Messages flow through the SDP extension 118 between queues controlled by queue managers. FIG. 3 shows three examples of queue managers for Java Message Service queues for specific types of messages: the metering queue manager 314, the batch feed queue manager 316, and the error handler queue manager 318.

The metering component 206 in the architecture 300 may include message reception and processing logic, such as the listener logic 320, and various message processing logic 322. The batch feed logic 208 may include scheduling logic 324 for controlling when data is communicated in batch form to other systems, as well as message processing logic 326.

The data access layer 328 may include data management logic for different functionality in the SDP extension 118. For example, the data access layer 328 may include a metering data manager 330, a routing data manager 332, and an error data manager 334. Each of the specific data managers may coordinate data flow between the persistence manager 336 and the SDP extension database 338 in the data layer 340. The persistence manager 336 may control how long and how much data is retained in the SDP extension database 338. The SDP extension database 338 may include the persistent layer 216 as part of a unified data model, or as a separate database.

Figure 4:
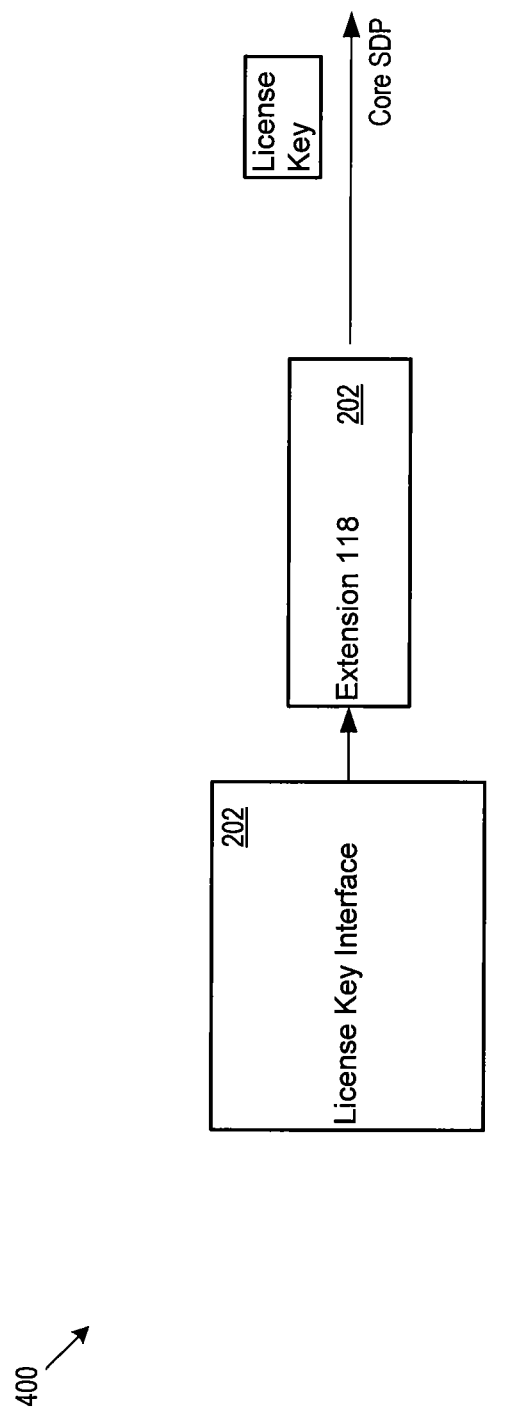
FIG. 4 shows a one click on-boarding use case for a service delivery platform extension.

FIG. 4 shows a one click on-boarding use case 400 to initially register a service delivery platform extension 118. In one implementation, a license key may be provided by a service provider to the service reseller 104 upon fulfillment of any defined contractual obligations. The license key may be stored for reference in the core SDP 120, along with the service reseller information and status (e.g., initial status=locked). The registration sequence includes: 1) the SDP extension hardware is installed at the service reseller; 2) the SDP extension administration UI is accessed via a web browser; 3) the license key is entered, so that the SDP extension 118 is registered in the core SDP 120 (e.g. the service reseller is "onboarded"); and 4) upon registration completion, the SDP extension is unlocked and ready to be used.

Figure 5:
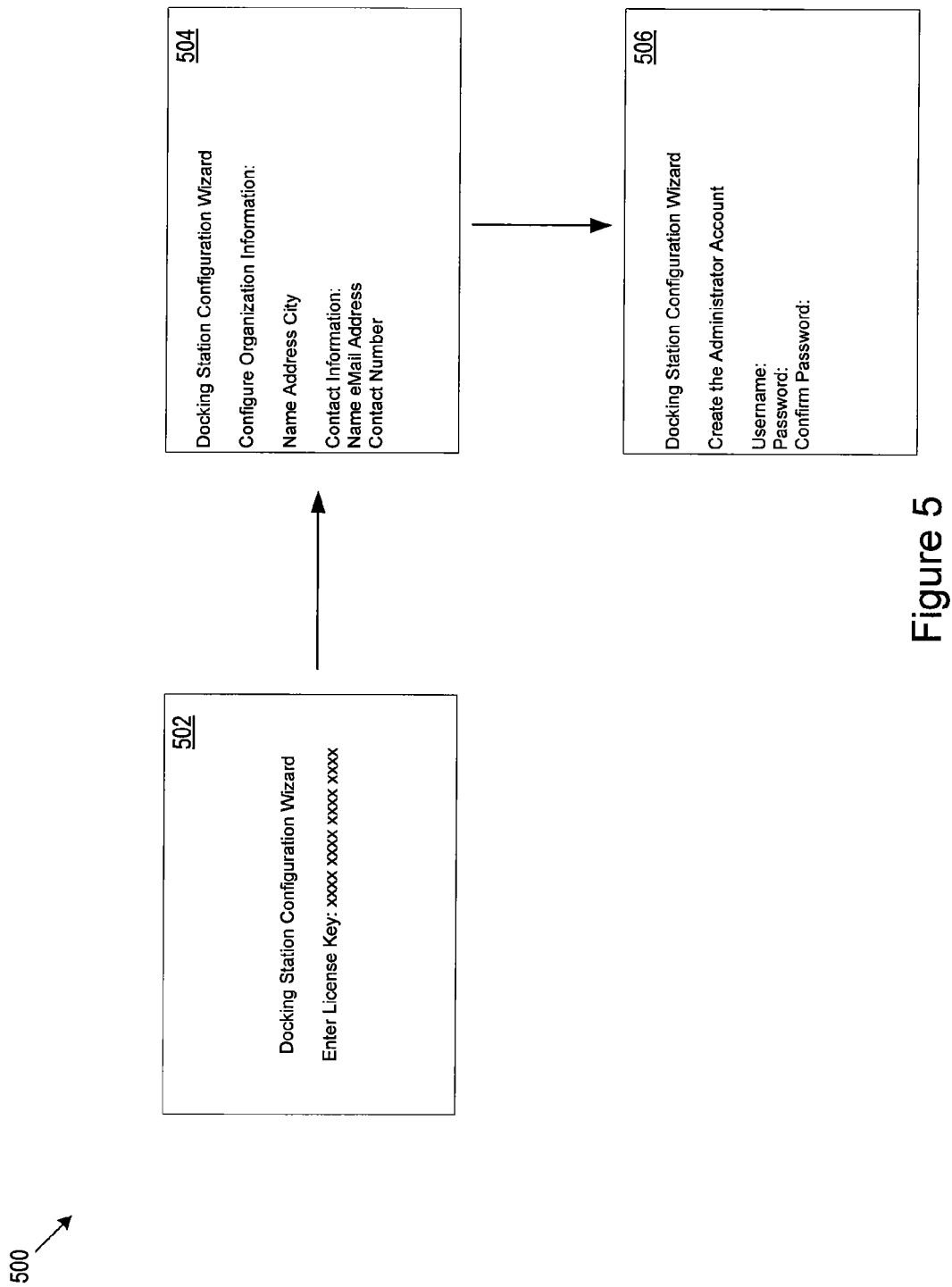
FIG. 5 shows the user experience of a one click on-boarding use case for a service delivery platform extension.

FIG. 5 shows the user experience 500 of a one click on-boarding use case for a service delivery platform extension. The retailer administrator accesses the SDP extension User Interface and navigates through the first-access Configuration Wizard 502, in which the service reseller administrator inserts the license key to unlock the SDP extension 118. In the user interface 504, the service reseller information is displayed and the user can optionally modify contact information. In the user interface 506, the administrator creates an SDP extension account, for example by providing username and password information.

Figure 6:
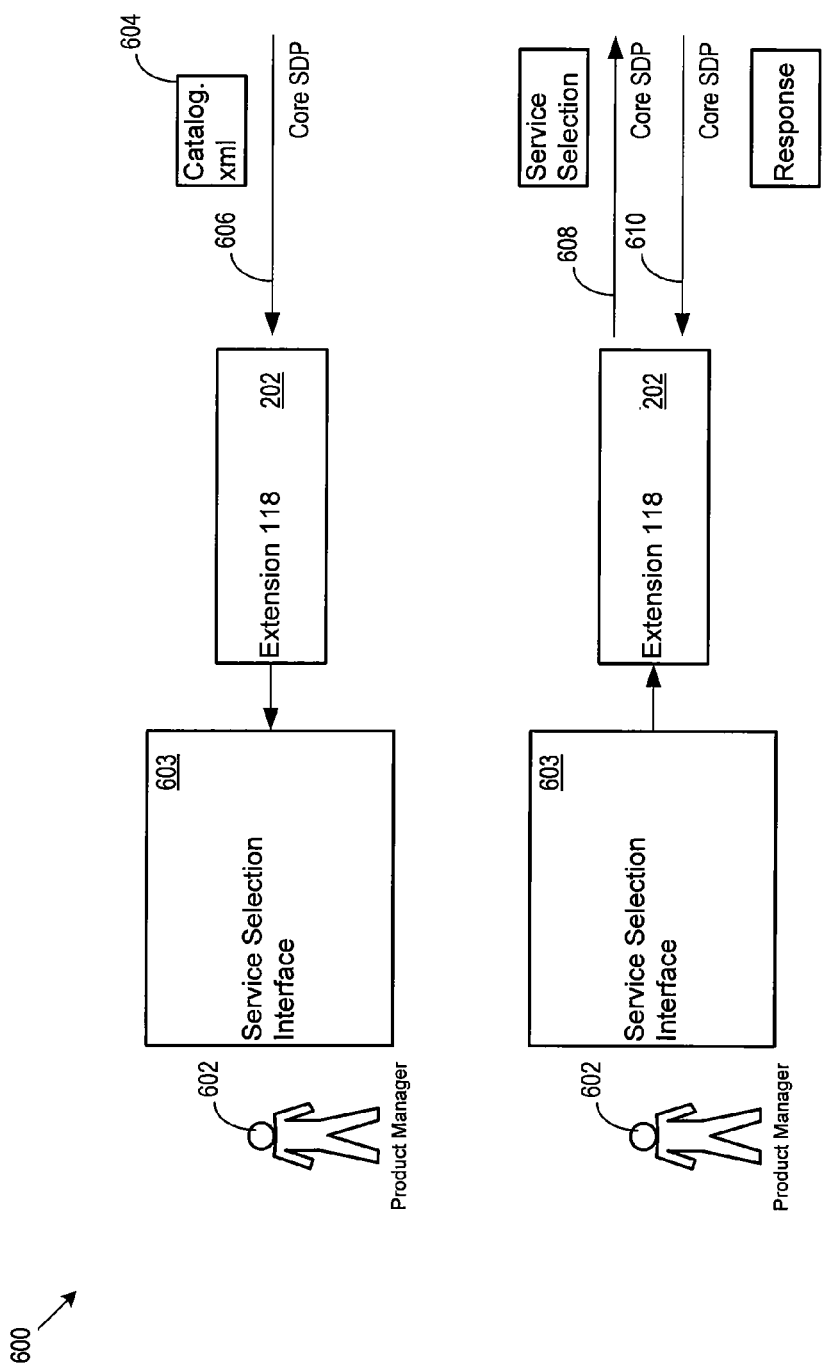
FIG. 6 shows an example of service provisioning through the service delivery platform extension.

FIG. 6 shows an example of service provisioning 600 through the service delivery platform extension 118. In particular, a product manager 602 interacts with a service selection user interface 603 to initiate (e.g., through the SDP extension administration GUI component 204), a retrieval process (606) to retrieve a service product catalogue 604 from the core SDP 120. The service catalog 604, may, for example, be an XML file defining each product or service available from the core SDP 120. The product manager 602 clicks on a product (for example the Digital File Locker product) and the extension 118 activates the product by sending corresponding service activation messages to the core SDP 120 (608). In some implementations, the selected service may be supported in the extension 118 by separately downloaded and installed applications, such as portlets. FIG. 6 shows an example of an application download (610) through which the digital file locker portlet is downloaded from the core SDP 120 into a specific folder of the SDP extension 118, from which the SDP extension 118 installs the application.

Figure 7:
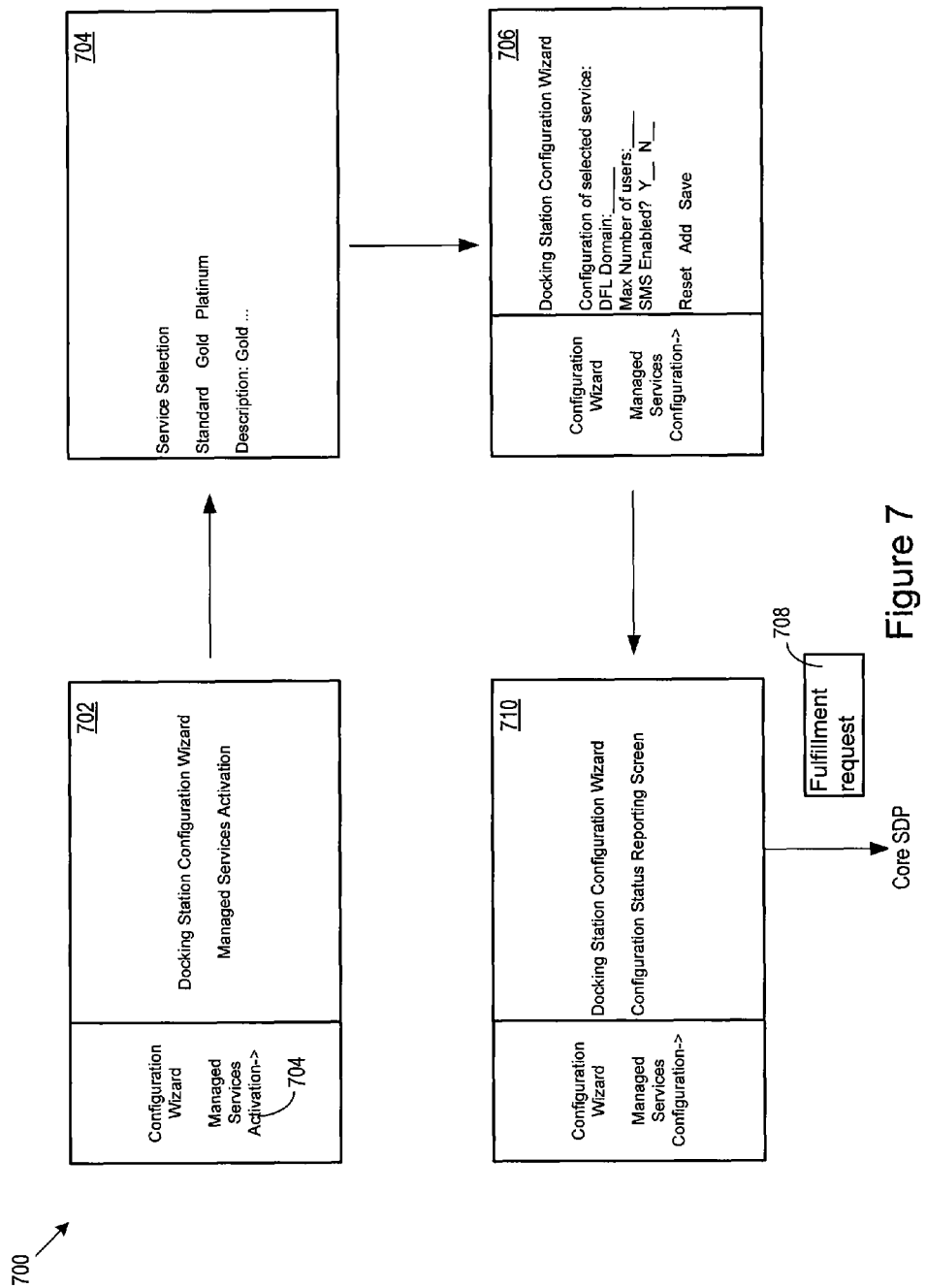
FIG. 7 shows an example of the user experience of service provisioning through the service delivery platform extension.

FIG. 7 shows an example of the user experience 700 of service provisioning through the service delivery platform extension. Initially, the SDP extension 118 retrieves from the core SDP 120 the product catalogue 604. The service reseller product manager accesses the configuration wizard user interface screen 702 to select one of the available products to activate, e.g., through a managed services activation link 704. The SDP extension 118 asks the service reseller product manager to choose among different product or service configurations (e.g., DFL configurations Standard, Gold or Platinum) in the service selection user interface 704. The service selection user interface 704 displays sales, marketing, and technical details for each selectable service configuration.

Upon selection of a service configuration, the SDP extension 118 may ask the product manager to provide additional service technical parameters. The additional parameters may establish, set, or otherwise configure the service for use (e.g., to set domain names, bandwidth, maximum number of users, to enable SMS functionality), and other configuration options. Such parameters may be entered through the services configuration user interface 706, for example.

The SDP extension 118 accepts the information entered through the user interfaces 702-706 and generates an order fulfillment request 708. The SDP extension 118 sends the order fulfillment request 708 to the core SDP 120. The core SDP 120 may accept, process, and activate the service, then send back an acknowledgement to the SDP extension 118. If the acknowledgement indicates successful activation, then the SPD extension 118 may insert a link to access the service on a home page access through the SDP extension 118. Alternatively, the SDP extension 118 may insert or install a supporting application or portlet into the subscriber portal accessed by subscribers to facilitate access to the newly activated product or service. The station user interface 710 may report whether activation has succeeded or failed.

Figure 8:
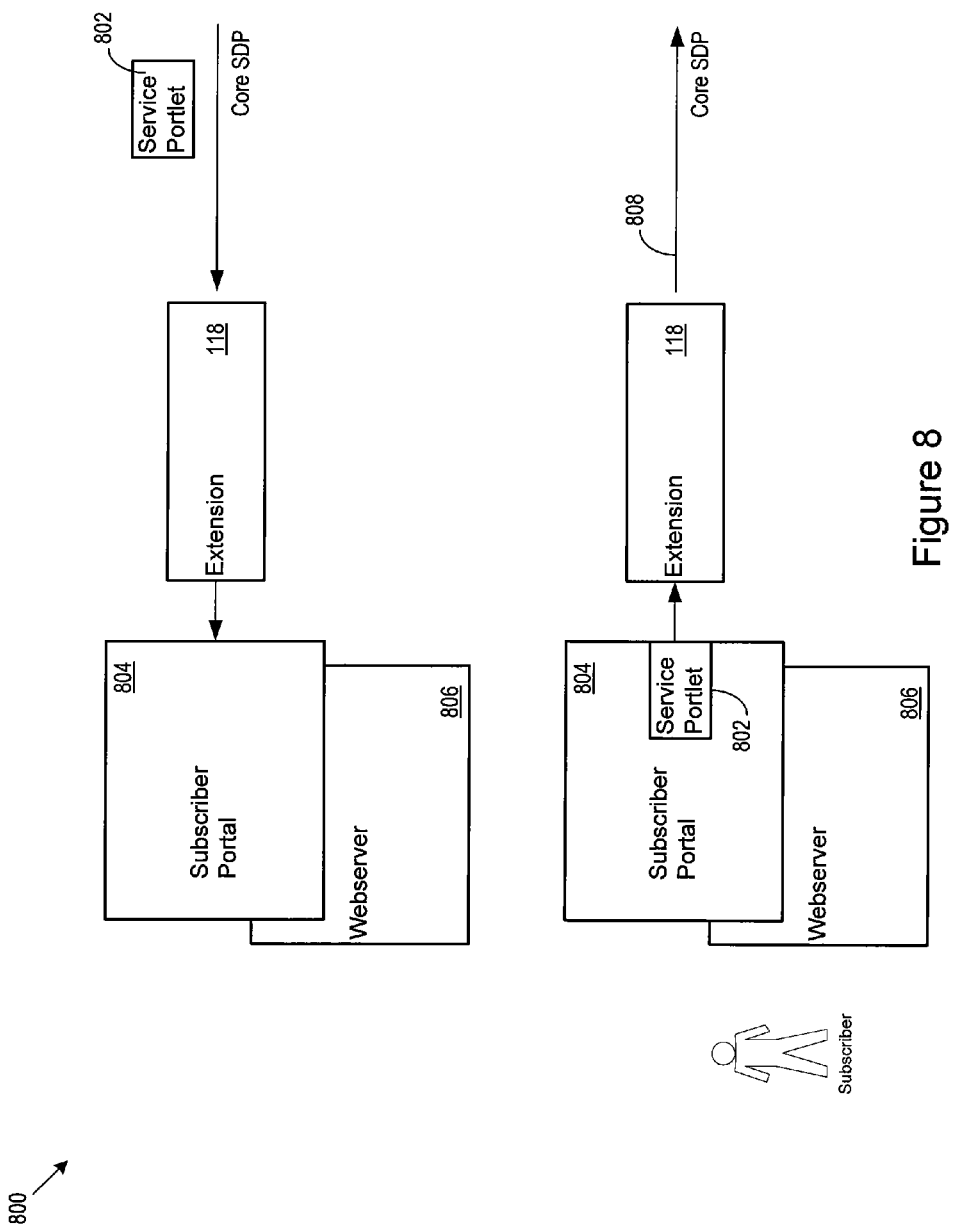
FIG. 8 shows an example of service delivery through the service delivery platform extension.

FIG. 8 shows an example of service delivery 800 through the service delivery platform extension 118. In particular, FIG. 8 shows a service portlet 802 for facilitating access to the newly activated service that is downloaded from the core SDP 120. The SDP extension 118 inserts the service portlet 802 into the subscriber portal 804 accessed by subscribers to facilitate access to the newly activated product or service. The subscriber portal 804 may be hosted on a local webserver 806. Accordingly, the new service is accessed (808) through the SDP extension 118 via the service portlet 802.

Figure 9:
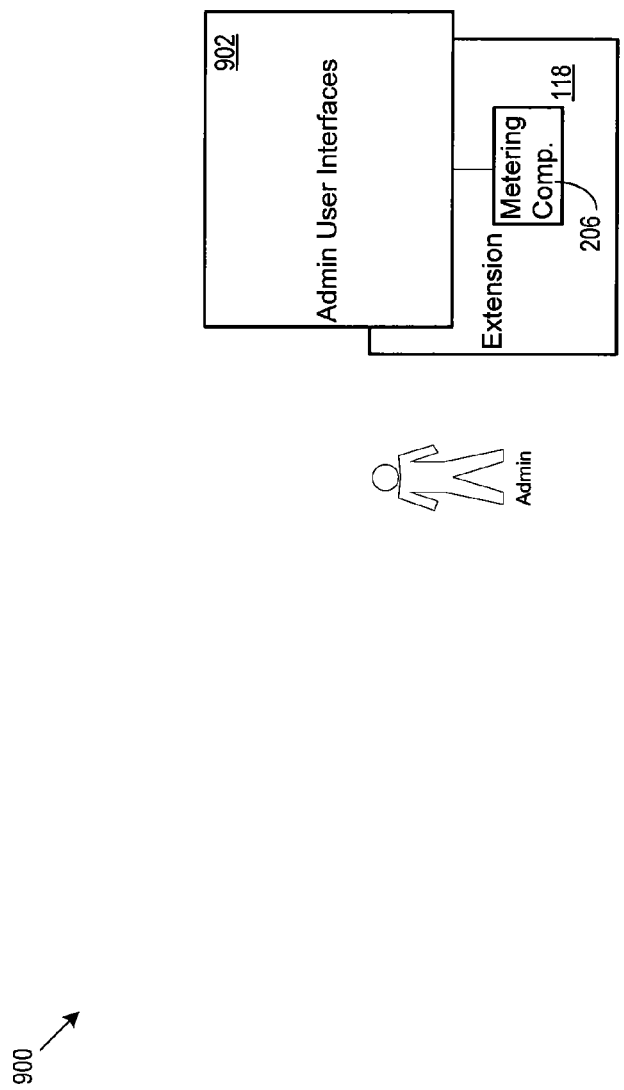
FIG. 9 shows a reporting interface for a service delivery platform extension.

FIG. 9 shows reporting functionality 900 for the service delivery platform extension 118. In particular, the metering component 206 stores CDRs and other transaction information within the platform extension 118 (e.g., in the persistent layer 216). Accordingly, the CDRs and transaction information is readily available to the administrator for the SDP extension 118. The administrator may access the information stored by the metering component 206 through one or more administration user interface screens 902, which may be designed to report any desired reporting information retrieved or derived from the information retained by the metering component 206. More particularly, an administrator may access the SDP extension 118 administration user interfaces 902 via a web browser, for example, to access a metering console. The metering component locally meters telecommunications service calls flowing through the service delivery platform extension and arising from telecommunication service use. The information stored in the metering component 206 may be used for billing, revenue sharing, or other business intelligence purposes.

Figure 10:
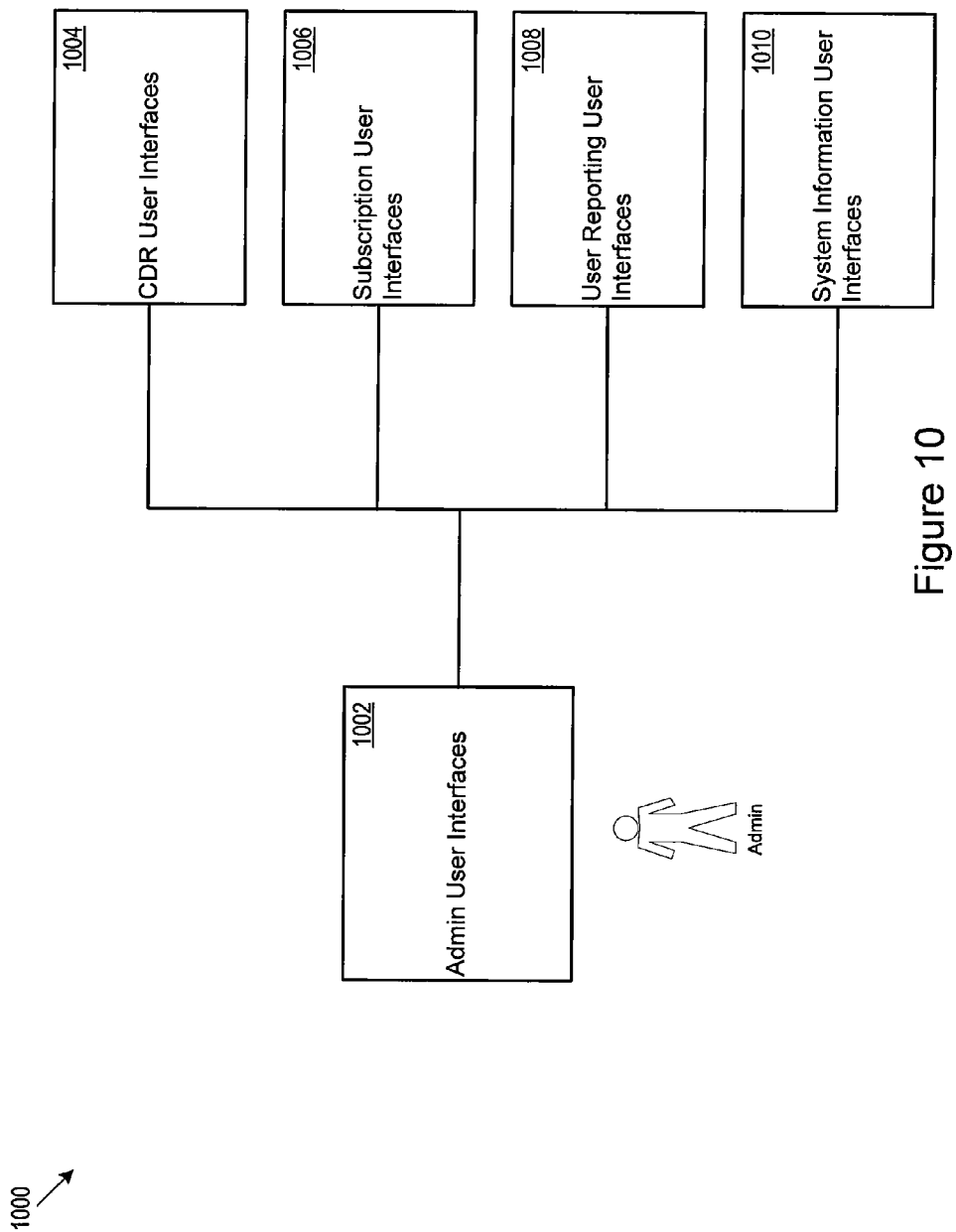
FIG. 10 shows the user experience of the reporting capability of the service delivery platform extension.

FIG. 10 shows the reporting functionality 1000 of the service delivery platform extension 118 in more detail. The administrator accesses a reporting home page 1002. In the example shown in FIG. 10, the home page 1002 provides links to four main reporting categories and the functionality to export any selected data to Excel spreadsheets. In particular, FIG. 10 shows a CDR user interface 1004, which reports, e.g., information for billing and revenue sharing purposes; a subscriptions user interface 1006, which reports, e.g., the number of transactions and subscriptions for each SDP extension managed and hosted service; a user reporting user interface 1008, which reports, e.g., the number of subscriber accesses and subscriptions; and a system information user interface 1010, which reports, e.g., system technical information such as available disk space.

Figure 11:
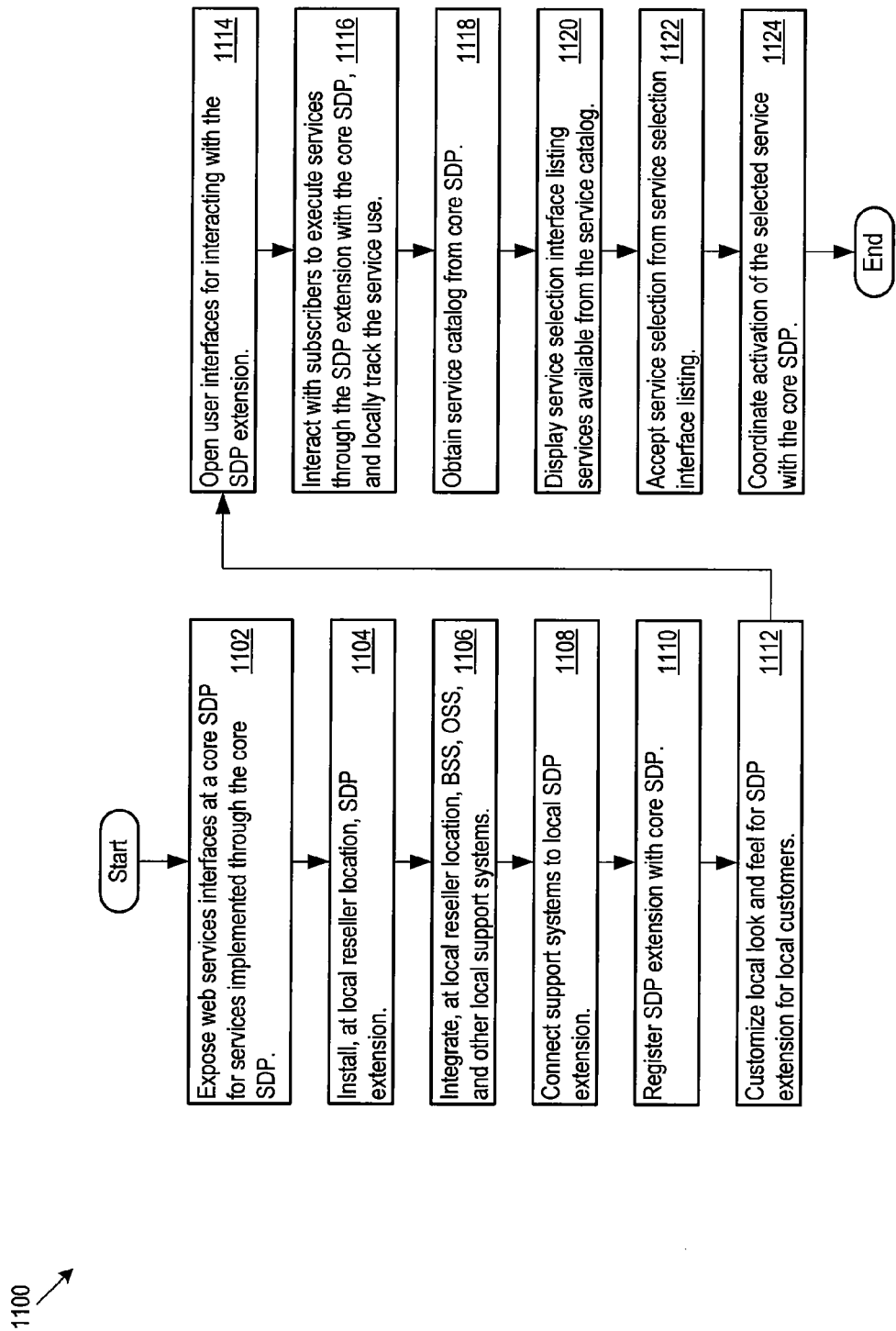
FIG. 11 shows an example of a service delivery platform extension adoption lifecycle and service provisioning logic.

FIG. 11 shows an example of logical flow 1100 for implementing a multi-layer SDP 100. The core SDP 120 exposes web services (or other interfaces) for the services that the core SDP 120 implements and makes available (1102). At one or more local reseller locations, a local reseller installs SDP extensions (1104). The SDP extensions are supported by local BSS, OSS, and other support systems (1106) which are connected to the SDP extension (1108). As a result, a two layer SDP implementation is formed, which includes an SDP extension to facilitate local management, control, and customization over the local user experience, while leveraging the complete set of available functionality at the core SDP 120. As described above with respect to FIGS. 4 and 5, the local SDP extension 118 is registered and activated with the SDP core 120 (1110).

One technical advantage provided by the SDP extension 118 is its flexibility in terms of local customization (e.g., look and feel) for local customers. In that respect, the local reseller may customize the interfaces through which subscribers interact with the SDP extension 118 to any extent (1112).

In operation, the SDP extension 118 implements user interfaces such as the subscriber user interface 202 and the administration user interface 204 (1114). The SDP extension 118 interacts with the subscribers to execute services through the core SDP 120, while locally metering the service use using the metering component 206 (1116).

In addition, as noted above with respect to FIGS. 6 and 7, the SDP extension 118 may obtain a service catalog 604 of available services from the core SDP 120 (1118). The SDP extension 118 generates and displays a service selection interface 603. The service selection interface 603 may display the services available from the core SDP 120, as listed in the service catalog. The SDP extension 118 may also accept service selections from the service selection interface listing (1122), and coordinate activation of the selected service with the core SDP 120 (1124).

The service delivery platform extension 118 may include a subscriber user interface component, a service metering component, a core service delivery platform interface component, and a local service orchestration component. The local service orchestration component may implement an enterprise service bus in communication with the subscriber user interface component, the administration user interface component, and the core service delivery platform interface component. In addition, the local service orchestration component may include service provisioning logic operable to generate a local service provisioning interface on the subscriber user interface component, receive a subscriber service provisioning request for a telecommunication service through the subscriber user interface component, communicate the subscriber service provisioning request through the local service orchestration component to the core service delivery platform interface component, communicate telecommunications service provisioning messages, through the core service delivery platform interface component, to a remote core service delivery platform which implements service provisioning to fulfill the service provisioning request, and locally meter, using the metering component, telecommunications service calls flowing through the service delivery platform extension and arising from the telecommunication service.

The service provisioning logic may be further programmed to download from the remote core service delivery platform a plugin extension for implementing the telecommunication service, and locally install the plugin extension in the service delivery platform extension. In addition, the service provisioning logic may be further operable to download a service catalog of available telecommunications services from the remote core service delivery platform, display a telecommunications service selection menu on the local service provisioning interface, the service selection menu comprising telecommunication service entries derived from the service catalog, as well as receive a subscriber service provisioning request for a telecommunication service selected from the telecommunications service selection menu.

The systems, components, and logic described above may be implemented in many different ways, including a combination of hardware and software, or as software for installation on any desired operating system including Linux, Unix, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network. The systems may be implemented in software, hardware, or a combination of software and hardware.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

The transport layer between components and systems such as the core SDP and the SDP extension 118 or user devices and the core SDP 120 may include Transport Control Protocol (TCP), Real Time Transport Protocol (RTP) or other transport logic. The network layer may route information based on Internet Protocol v4, v6 (i.e., IPv4 or IPv6) or other network layer protocols. The data link layer may include wired or wireless links, such as IEEE 802.11, WiFi, WiMAX, Asynchronous Transfer Mode (ATM), Fiber Distributed Data Interface (FDDI), Ethernet, or other data link layers over optical fiber, coaxial cable, twisted pair or other physical layers.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

The hardware and software platforms that run in the SDP DS may vary widely. As examples, the endpoints may run the Windows CE™ operating system, JAVA ME™ system, Symbian™ operating system, Palm™ operating system. The hardware platforms may be implemented with a general purpose processing platform, such as those available from Sun Microsystems, Hewlett Packard, or International Business Machines and running Unix, Windows™, Linux or other operating systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for implementing a telecommunications service delivery platform, comprising:
    locally implementing, at a first physical location, a service delivery platform extension, comprising:
        a subscriber user interface component;
        a service metering component;
        a core service delivery platform interface component; and
        a local service orchestration component comprising an enterprise service bus in communication with the subscriber user interface component, the service metering component, and the core service delivery platform interface component;
    generating a local service provisioning interface on the subscriber user interface component;
    receiving a subscriber service provisioning request for a telecommunication service through the subscriber user interface component;
    communicating the subscriber service provisioning request through the local service orchestration component to the core service delivery platform interface component;
    communicating a telecommunications service provisioning message, through the core service delivery platform interface component, to a remote core service delivery platform, in a second physical location, via a web services interface of the remote core service delivery platform, which implements service provisioning to fulfill the service provisioning request; and
    locally metering, using the metering component, telecommunications service calls flowing through the service delivery platform extension and arising from the telecommunication service.

2. The method of claim 1, further comprising:
downloading from the remote core service delivery platform a plug in extension for implementing the telecommunication service; and
locally installing the plugin extension in the service delivery platform extension.

3. The method of claim 1, further comprising:
downloading a service catalog of available telecommunications services from the remote core service delivery platform.

4. The method of claim 3, further comprising:
displaying a telecommunications service selection menu on the local service provisioning interface, the service selection menu comprising telecommunication service entries derived from the service catalog.

5. The method of claim 4, where receiving comprises:
receiving a subscriber service provisioning request for a telecommunication service selected from the telecommunications service selection menu.

6. A service delivery system, comprising:
a service delivery platform extension that operates on a computers system located at
a first physical location, the service delivery platform extension comprising:
    a subscriber user interface component;
    a service metering component;
    a core service delivery platform interface component; and
    a local service orchestration component comprising an enterprise service bus in communication with the subscriber user interface component, the subscriber user interface component, and the core service delivery platform interface component, the local service orchestration component comprising service provisioning logic operable to:
        generate a local service provisioning interface on the subscriber user interface component;
        receive a subscriber service provisioning request for a telecommunication service through the subscriber user interface component;
        communicate the subscriber service provisioning request through the local service orchestration component to the core service delivery platform interface component;
        communicate telecommunications service provisioning messages, through the core service delivery platform interface component, to a remote core service delivery platform, in a second physical location, via a web services interface of the remote core service delivery platform, which implements service provisioning to fulfill the service provisioning request; and locally meter, using the metering component, telecommunications service calls flowing through the service delivery platform extension and arising from the telecommunication service.

7. The service delivery platform of claim 6, where the service provisioning logic is further operable to:

download from the remote core service delivery platform a plugin extension for implementing the telecommunication service; and locally install the plugin extension in the service delivery platform extension.

8. The service delivery platform of claim 6, where the service provisioning logic is further operable to:

download a service catalog of available telecommunications services from the remote core service delivery platform.

9. The service delivery platform of claim 8, where the service provisioning logic is further operable to:

display a telecommunications service selection menu on the local service provisioning interface, the service selection menu comprising telecommunication service entries derived from the service catalog.

10. The service delivery platform of claim 9, where the logic operable to receive comprises:

logic operable to receive a subscriber service provisioning request for a telecommunication service selected from the telecommunications service selection menu.

11. A non-transitory machine readable medium including instructions which when executed by a data processing system, cause the data processing system to:

locally implement, at a first physical location, a service delivery platform extension, comprising:
  a subscriber user interface component;
  a service metering component;
  a core service delivery platform interface component; and
  a local service orchestration component comprising an enterprise service
  bus in communication with the subscriber user interface component, the service metering component, and the core service delivery platform interface component;
generating a local service provisioning interface on the subscriber user interface component;

receive a subscriber service provisioning request for a telecommunication service through the subscriber user interface component;

communicate the subscriber service provisioning request through the local service orchestration component to the core service delivery platform interface component;

communicate a telecommunications service provisioning message, through the core service delivery platform interface component, to a remote core service delivery platform, in a second physical location, via a web services interface of the remote core service delivery platform, which implements service provisioning to fulfill the service provisioning request; and locally meter, using the metering component, telecommunications service calls flowing through the service delivery platform extension and arising from the telecommunication service.

12. The non-transitory machine readable medium of claim 11, wherein the instructions when executed by the data processing system, further cause the data processing system to:

download from the remote core service delivery platform a plugin extension for implementing the telecommunication service; and locally installing the plugin extension in the service delivery platform extension.

13. The non-transitory machine readable medium of claim 11, wherein the instructions when executed by the data processing system, further cause the data processing system to:

download a service catalog of available telecommunications services from the remote core service delivery platform.

14. The non-transitory machine readable medium of claim 13, wherein the instructions when executed by the data processing system, further cause the data processing system to:

display a telecommunications service selection menu on the local service provisioning interface, the service selection menu comprising telecommunication service entries derived from the service catalog.

15. The non-transitory machine readable medium of claim 14, wherein the instructions when executed by the data processing system, further cause the data processing system to:

receive a subscriber service provisioning request for a telecommunication service selected from the telecommunications service selection menu.

* * * * *